US012278020B1

(12) United States Patent
Meng et al.

(10) Patent No.: US 12,278,020 B1
(45) Date of Patent: Apr. 15, 2025

(54) SUPPORTING INSULATION BASE OF NEGATIVE HIGH-VOLTAGE POTENTIAL NEUTRON TARGET OF COMPACT NEUTRON SOURCE

(71) Applicant: Institute of Energy, Hefei Comprehensive National Science Center (Anhui Energy Laboratory), Anhui (CN)

(72) Inventors: Xiancai Meng, Anhui (CN); Xu Li, Anhui (CN); Lizhen Liang, Anhui (CN); Yuzhong Qian, Anhui (CN); Bing Hong, Anhui (CN)

(73) Assignee: Institute of Energy, Hefei Comprehensive National Science Center (Anhui Energy Laboratory), Hefei (CN)

( * ) Notice: Subject to any disclaimer, the term of this patent is extended or adjusted under 35 U.S.C. 154(b) by 0 days.

(21) Appl. No.: 18/927,668

(22) Filed: Oct. 25, 2024

(30) Foreign Application Priority Data

Jan. 24, 2024 (CN) ......................... 202410096932.4

(51) Int. Cl.
*G21K 5/08* (2006.01)

(52) U.S. Cl.
CPC ...................................... *G21K 5/08* (2013.01)

(58) Field of Classification Search
CPC ............... H05H 3/06; H05H 6/00; G21K 5/08
See application file for complete search history.

(56) References Cited

U.S. PATENT DOCUMENTS

2024/0032182 A1* 1/2024 Martellini ................ H05H 6/00

FOREIGN PATENT DOCUMENTS

CN 107708284 A * 2/2018

* cited by examiner

*Primary Examiner* — David E Smith
*Assistant Examiner* — Hsien C Tsai
(74) *Attorney, Agent, or Firm* — Seed IP Law Group LLP

(57) ABSTRACT

The present disclosure discloses a supporting insulation base of a negative high-voltage potential neutron target of a compact neutron source, including a cylindrical coolant liquid channel, a cylindrical high-voltage channel, an upper cover plate and a lower cover plate, which are integrally formed by 3D printing using a PEEK material. The cylindrical coolant liquid channel respectively provides coolant liquid for a extraction electrode and a neutron target; the cylindrical high-voltage channel provides a negative high voltage for the extraction electrode and the neutron target; the cylindrical channel is connected to the upper cover plate and the lower cover plate; a cooling channel is provided inside the upper cover plate, the lower cover plate is used for sealing a vacuum chamber and supporting the cylindrical channel, and a sealing groove is provided on a surface of the lower cover plate for sealing the vacuum chamber; the PEEK material has higher voltage resistance; and 3D printing can omit the design of a butt seal between the cylindrical channel and the upper and lower cover plates, reducing the cost and improving economic efficiency. The structure of the present disclosure has the functions of insulation, vacuum sealing and reducing y rays while ensuring the negative high voltage and cooling for the electrode and the neutron target, so as to support the application of the compact negative high-voltage neutron source.

3 Claims, 2 Drawing Sheets

SUPPORTING INSULATION BASE OF NEGATIVE HIGH-VOLTAGE POTENTIAL NEUTRON TARGET OF COMPACT NEUTRON SOURCE

TECHNICAL FIELD

The present disclosure relates to the technical field based on applications in production and daily life of accelerator neutron sources, and in particular to a supporting insulation base of a negative high-voltage potential neutron target of a compact neutron source.

RELATED ART

Since the discovery of neutrons in 1932 by Chadwick, neutrons have been widely used in fields of scientific research, national defense, medical care and industry because of their characteristics of being uncharged and having magnetic moment. The charge number of neutron is zero, there is no coulomb barrier between a neutron and a nucleus, and the interaction cross-section is large, which is an important key to study nuclear reaction and nuclear structure, and thus opens the gate of releasing atomic energy. The interaction between the neutron and the nucleus makes the nucleus transmute from one nuclide to another nuclide, which can be used for radioisotope production, material modification and elemental analysis. The neutron "has high linear energy transfer (LET)", which is suitable for tumor treatment and radiation breeding; the neutron has fluctuations, and neutron scattering and diffraction are important means to study a microstructure of a substance. The neutrons have magnetic moments and can interact magnetically with atoms, and are natural probes to detect the magnetic properties of microscopic structures. With the development of neutron application technology, the demand for various neutron sources is increasing.

Compared with other types of neutron sources, deuterium-deuterium (DD) or deuterium-tritium (DT) neutron generators have the advantages of relatively low cost, short construction period, high safety and easy operation, and the subfield intensity is sufficient to meet the needs of most research and applications. However, when the neutron source is running, there are high requirements for the neutron target: 1. Since a surface of the neutron target is bombarded by a beam, the temperature increases, so a coolant liquid is needed to make the target temperature not too high to cause a complete dissipation of deuterium adsorbed on the target surface, which would result in a decrease of neutron yield. 2. The shooting process is always under a vacuum environment, so the installation of a target cooling structure cannot destroy the vacuum condition in a shooting chamber, and sealing shall be ensured. 3. A neutron source lead-out structure needs to be connected with a high voltage, and it needs to be ensured that a target support structure cannot be broken down by the high voltage to ensure a withstand voltage. 4. It is desirable to reduce the interaction with the base material during neutron movement and reduce the generation of γ rays. Therefore, a supporting insulation base of a negative high-voltage potential neutron target of a compact neutron source is designed.

SUMMARY OF THE DISCLOSURE

The present disclosure provides a supporting insulation base of a negative high-voltage potential neutron target of a compact neutron source, the structure of which has the functions of insulation, vacuum sealing and reducing γ rays while ensuring the negative high voltage and cooling for the electrode and the neutron target, so as to support the application of the compact negative high-voltage neutron source in production and daily life.

The present disclosure is achieved by the following technical solutions:

A supporting insulation base of a negative high-voltage potential neutron target of a compact neutron source, including a cylindrical coolant liquid channel, a cylindrical high-voltage channel, an upper cover plate and a lower cover plate, which are integrally formed by 3D printing using a PEEK material.

Further, the cylindrical coolant liquid channels are all hollow channels with a certain inner diameter, and are symmetrically distributed with a neutron target as a center; and a top end of the cylindrical coolant liquid channel is in communication with an internal coolant liquid passage of the upper cover plate, and is shunted via the internal coolant liquid passage of the upper cover plate and flows to internal cooling channels of the neutron target and a extraction electrode respectively, and provide coolant liquid for the neutron target and the extraction electrode. A bottom end of the cylindrical coolant liquid channel is in communication with the lower cover plate and is provided with a design of a quick plug interface, so as to facilitate plugging and unplugging of a coolant liquid pipeline at any time and ensure a sealing performance.

Further, the cylindrical high-voltage channel is a cylindrical channel having a certain inner diameter and being hollow. An upper end of the high-voltage channel is in communication with the upper cover plate, a hole position at an outlet of the upper cover plate is located directly below the extraction electrode, such that a high-voltage line passes through the channel and contacts with a bottom of the extraction electrode to provide a high voltage for the extraction electrode. A lower end of the high-voltage channel is in communication with the lower cover plate, and a plurality of screw holes are distributed around an outlet connection position of the lower cover plate for fixing the high-voltage line.

Further, the upper cover plate is connected in communication with the cylindrical coolant liquid channel and the cylindrical high-voltage channel; an inner ring of the upper cover plate is provided with a plurality of neutron target fixing screw holes, and an outer ring is provided with a plurality of extraction electrode fixing screw holes, wherein hole positions respectively correspond to hole positions of the target and the extraction electrode themselves, so as to facilitate installation and fixing of the neutron target and the extraction electrode; the upper cover plate is internally provided with two internal coolant liquid passages for connecting the two cylindrical coolant liquid channels with the internal cooling channels of the neutron target and the extraction electrode, one end of the internal coolant liquid passage is in communication with the cylindrical coolant liquid channel, and the other end of the internal coolant liquid passage is shunted to the neutron target and the extraction electrode; and the neutron target and extraction electrode are provided with sealing grooves at corresponding positions to ensure sealing of the coolant liquid passage of a contact portion.

Further, the lower cover plate is connected in communication with the cylindrical coolant liquid channel and the cylindrical high-voltage channel; an outlet of the coolant liquid channel is provided with a design of a quick plug interface, so as to facilitate plugging and unplugging of a coolant liquid machine pipeline at any time and ensure sealing performance; and an inner surface of the lower cover plate is opened with an O-shaped sealing groove for sealing with a cylindrical vacuum chamber.

Further, the operation principle of the coolant liquid channel is as follows: the coolant is led to the quick plug interface of the lower cover plate through the coolant liquid pipeline and flows through the cylindrical coolant liquid channel, and then is shunted via the internal coolant liquid passage of the upper cover plate to the internal coolant liquid passage of the extraction electrode. After carrying away internal heat of the neutron target and the extraction electrode, the coolant flows back to another internal coolant liquid passage of the upper cover plate and then joins to the second cylindrical coolant liquid channel, and finally carries the heat back to a water cooler for heat exchange.

The advantages of the present disclosure are as follows: the overall structure of the present disclosure is relatively compact, which is a simple, convenient and efficient solution to the problems of neutron source target cooling and negative high voltage feeding. While ensuring the internal vacuum of the source, it does not affect the neutron yield of the neutron source as much as possible, reducing the generation of γ rays, and providing a good technical basis for the support structure design of the DD/DT neutron generator.

Figure 1:
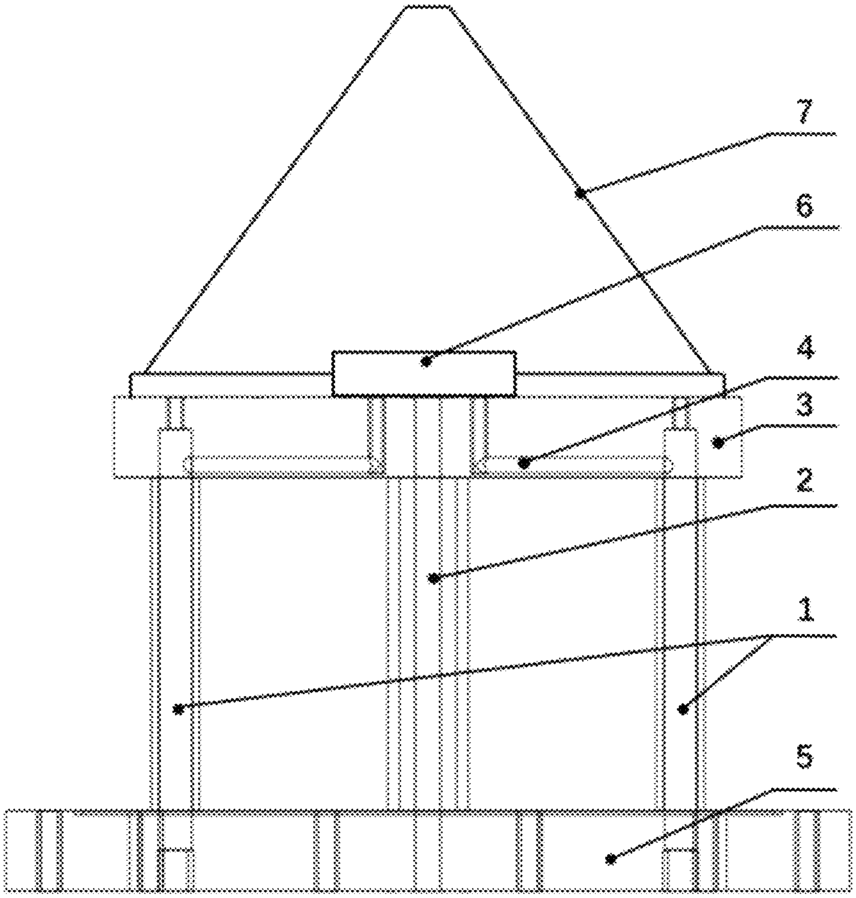
FIG. 1 is an overall schematic structural diagram of the present disclosure.

In the drawings, 1—cylindrical coolant liquid channel; 2—cylindrical high-voltage channel; 3—upper cover plate; 4—internal coolant liquid passage of the upper cover plate; 5—lower cover plate; 6—neutron target; 7—extraction electrode; 101—target coolant liquid passage hole position; 102—extraction electrode coolant liquid passage hole position; 201—high-voltage line hole position; 601—neutron target fixing screw hole; 701—extraction electrode fixing screw hole; 501—quick plug sealing joint; 502—high-voltage line fixing screw hole; 503—lower cover plate fixing screw hole; 504—lower cover plate sealing groove.

DETAILED DESCRIPTION

The present disclosure will now be described in detail in combination with the drawings and detailed embodiments. However, the following embodiments are only illustrative of the present disclosure, and the scope of protection of the present disclosure should be construed to include the entire contents of the claims, and a person skilled in the art can fully realize the entire contents of the claims through the description of the following embodiments.

As shown in FIG. 1, a supporting insulation base of a negative high-voltage potential neutron target of a compact neutron source includes a cylindrical coolant liquid channel 1, a cylindrical high-voltage channel 2, an upper cover plate 3 and a lower cover plate 5, which are integrally formed by 3D printing using a PEEK material. The cylindrical coolant liquid channel 1 provides coolant liquid for a extraction electrode 7 and a neutron target 6, respectively, and can effectively remove the heat deposited on the component by an ion beam and secondary electrons so as to avoid damage to the component; the cylindrical high-voltage channel 2 can provide a negative high voltage for the extraction electrode 7 and the neutron target 6 for plasma extraction to shoot target; the PEEK material has a high voltage resistance, which can prevent the discharge of extraction electrode 7 and the neutron target 6 with a vacuum chamber at a bottom of the base under a high voltage; the cylindrical channel is connected to the upper and lower cover plates so as to play a supporting role on the upper cover plate 3, and at the same time, the amount of PEEK can be reduced to reduce the generation of γ rays in the process of neutron movement; the upper cover plate 3 is used for supporting the neutron target 6 and the extraction electrode 7, and at the same time, an internal coolant liquid passage of the upper cover plate 4 is provided inside to connect the cylindrical coolant liquid channel 1 with the internal coolant liquid passage of the upper cover plate 4 of the neutron target 6 and the extraction electrode 7; and the lower cover plate 5 is used for the sealing of the vacuum chamber and the support of the cylindrical channel, and the surface of the lower cover plate 5 is provided with a lower cover plate sealing groove 504 for the sealing of the vacuum chamber.

Figure 2:
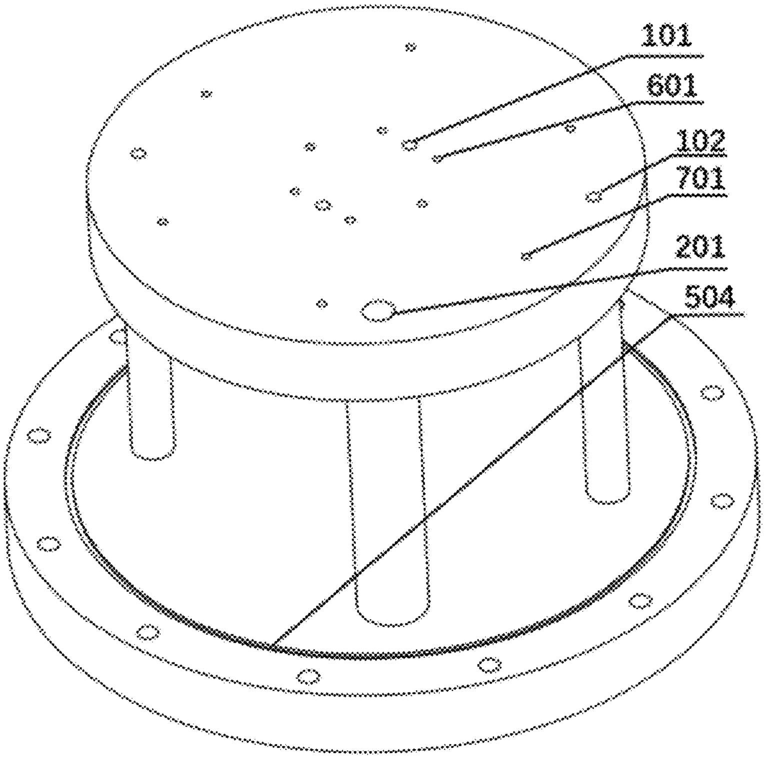
FIG. 2 is a schematic diagram of the hole position distribution of the upper cover plate of the present disclosure.
Figure 3:
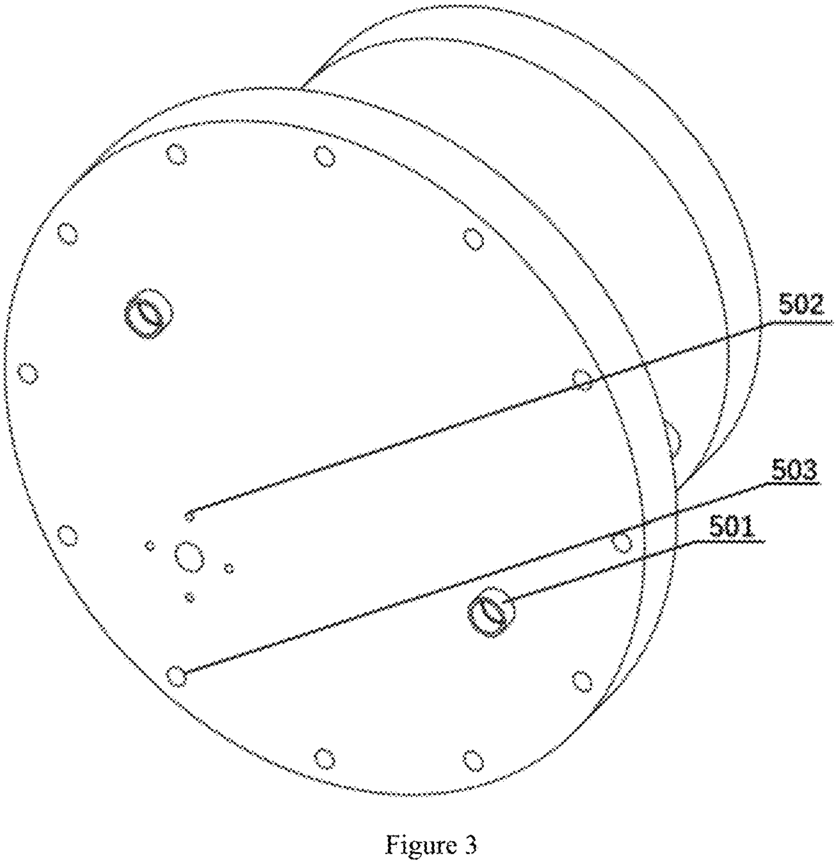
FIG. 3 is a schematic diagram of the hole position distribution of the lower cover plate of the present disclosure.

The present disclosure is further illustrated in combination with FIGS. 2 and 3 as an example.

(1) In use, the neutron target 6 is mounted in the center of the upper cover plate 3, and the upper cover plate is a cylindrical PEEK seat with Φ156 mm and a thickness of 20 mm; a cooling hole of the neutron target itself is connected in alignment with a target coolant liquid passage hole position 101 of the upper cover plate. The cooling hole of the neutron target itself is designed with a sealing groove to ensure vacuum sealing at an interface, and the neutron target 6 is fixed at the center of the upper cover plate 3 by means of six M3 type neutron target fixing screw holes 601.

(2) The extraction electrode 7 is mounted and fixed on the upper cover plate 3 via six M3 extraction electrode fixing screw holes 701; a cooling hole of the extraction electrode 7 itself is aligned and connected to a extraction electrode coolant liquid passage hole position 102 of the upper cover plate, and the cooling hole of the extraction electrode itself and a high-voltage line hole position 201 are designed with a sealing groove to ensure vacuum sealing at an interface; and the high-voltage line passes through the high-voltage line hole position 201 to make firm contact with the extraction electrode.

(3) The cylindrical coolant liquid channels 1 are cylindrical channels with an inner diameter of Φ8 mm and an outer diameter of Φ12 mm, and are symmetrically distributed around the neutron target.

(4) The high-voltage line passes through the lower cover plate 5 and passes through the cylindrical high-voltage channel 2 with an inner diameter of Φ9 mm and an outer diameter of Φ20 mm to contact the bottom of the extraction electrode 7; fixing screws are mounted via four M3 high-voltage line fixing screw holes 502 at the bottom of the lower cover plate 5 to fix the high-voltage line; and the lower cover plate is a cylindrical PEEK seat with Φ210 mm and thickness of 20 mm.

(5) The insulation base is integrally fixed to a bottom of the chamber through twelve M4 lower cover plate fixing screw holes 503, and ensures vacuum sealing with the chamber through a lower cover plate sealing grooves 504.

(6) The working principle of the coolant liquid channels of the insulation base is as follows: the coolant liquid is led to the quick plug sealing joint 501 of the lower cover plate 5 via a pipeline and flows through the cylindrical coolant liquid channel 1, and then is shunted to the internal coolant liquid passages of the neutron target 6 and the extraction electrode 7 via the internal coolant liquid passage of the upper cover plate 4. After carrying away the internal heat of the neutron target 6 and the extraction electrode 7, the coolant liquid flows back to another internal coolant liquid passage of the upper cover plate 3 and then is merged to a second cylindrical coolant liquid channel 1, and finally flows back to a water cooler for heat exchange.

The above-mentioned embodiments are only a description of the preferred embodiments of the present disclosure. The preferred embodiments neither set forth all the details specifically nor limit the disclosure to the specific implementations described. Without departing from the design spirit of the present disclosure, various modifications and improvements made by a person skilled persons in the art to the technical solutions of the present disclosure shall fall within the scope of protection determined by the claims of the present disclosure.

The invention claimed is:

1. A supporting insulation base of a negative high-voltage potential neutron target of a compact neutron source, characterized by comprising a cylindrical coolant liquid channel, a cylindrical high-voltage channel, an upper cover plate and a lower cover plate, which are integrally formed by 3D printing using a PEEK material, wherein the cylindrical coolant liquid channels are all hollow channels with a certain inner diameter, and are symmetrically distributed with a neutron target as a center; a top end of the cylindrical coolant liquid channel is in communication with an internal coolant liquid passage of the upper cover plate, and is shunted via the internal coolant liquid passage of the upper cover plate and flows to internal cooling channels of the neutron target and a extraction electrode respectively, and a bottom end of the cylindrical coolant liquid channel is in communication with the lower cover plate and is provided with a design of a quick plug sealing joint, so as to facilitate plugging and unplugging of a coolant liquid pipeline at any time and ensure a sealing performance; and the cylindrical high-voltage channel is a cylindrical channel having a certain inner diameter and being hollow, an upper end of the cylindrical high-voltage channel is in communication with the upper cover plate, a hole position at an outlet of the upper cover plate is located directly below the extraction electrode, such that a high-voltage line passes through the channel and contacts with a bottom of the extraction electrode to provide a high voltage for the extraction electrode, a lower end of the cylindrical high-voltage channel is in communication with the lower cover plate, and a plurality of high-voltage line fixing screw holes are distributed around an outlet connection position of the lower cover plate for fixing the high-voltage line.

2. The supporting insulation base of a negative high-voltage potential neutron target of a compact neutron source according to claim 1, characterized in that the upper cover plate is connected in communication with the cylindrical coolant liquid channel and the cylindrical high-voltage channel; an inner ring of the upper cover plate is provided with a plurality of neutron target fixing screw holes, and an outer ring is provided with a plurality of fixing extraction electrode fixing screw holes, wherein screw hole positions respectively correspond to hole positions of the neutron target and the extraction electrode themselves, so as to facilitate installation and fixing of the neutron target and the extraction electrode; the upper cover plate is internally provided with two internal coolant liquid passages for connecting the two cylindrical coolant liquid channels with the internal cooling channels of the neutron target and the extraction electrode, one end of the internal coolant liquid passage is in communication with the cylindrical coolant liquid channel, and the other end of the internal coolant liquid passage is shunted to the neutron target and the extraction electrode; and the neutron target and extraction electrode are provided with sealing grooves at corresponding positions to ensure sealing of the coolant liquid passage of a contact portion.

3. The supporting insulation base of a negative high-voltage potential neutron target of a compact neutron source according to claim 1, characterized in that the lower cover plate is connected in communication with the cylindrical coolant liquid channel and the cylindrical high-voltage channel; a target coolant liquid passage hole position is provided with a design of a quick plug sealing joint, so as to facilitate plugging and unplugging of a coolant liquid machine pipeline at any time and ensure sealing performance; and an inner surface of the lower cover plate is opened with an O-shaped lower cover plate sealing groove for sealing with a cylindrical vacuum chamber.

* * * * *